April 7, 1970  A. K. BEY  3,505,545
POLARIZED VIBRATORY MOTOR
Filed May 26, 1967  2 Sheets-Sheet 1
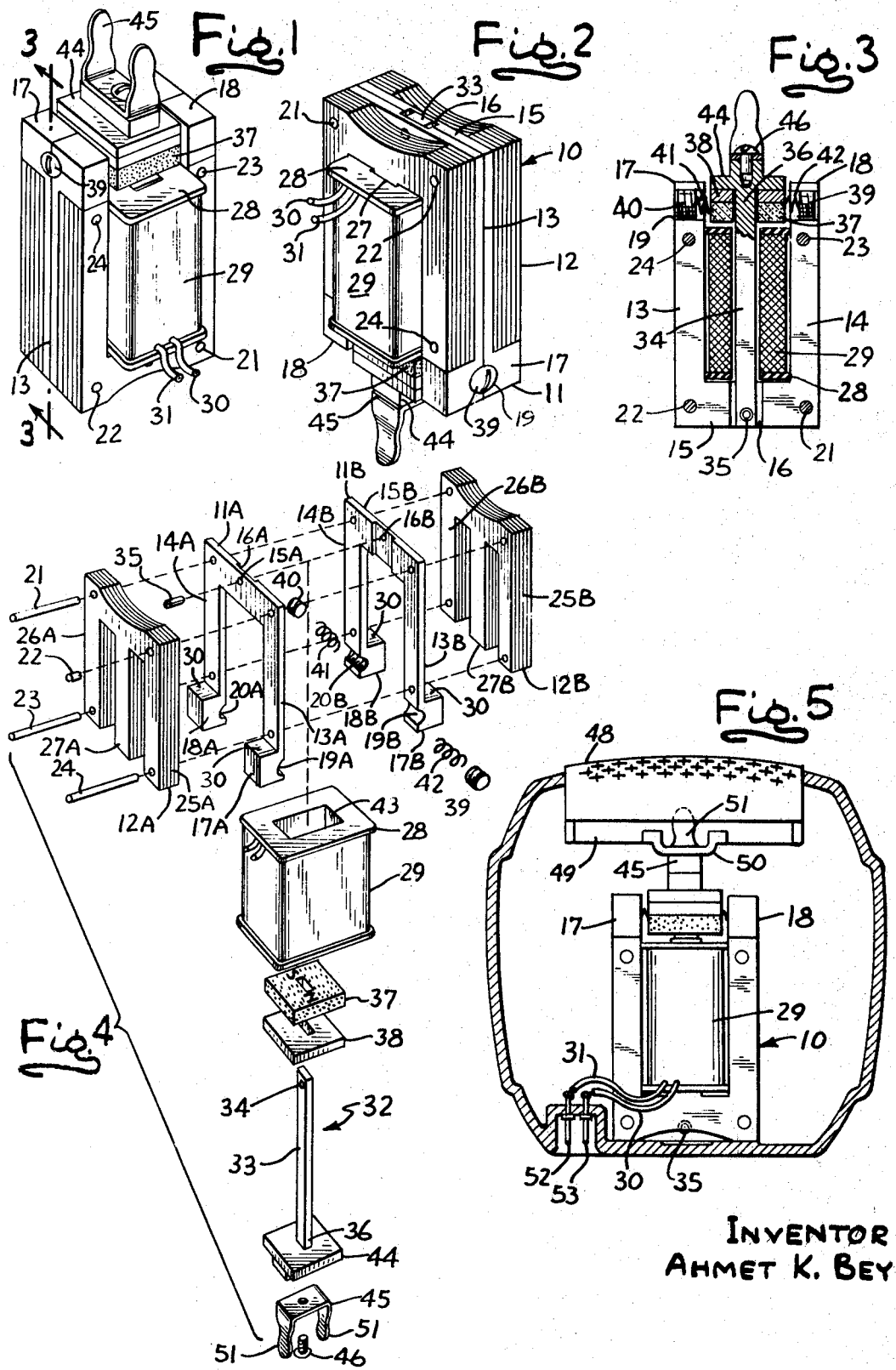
INVENTOR
AHMET K. BEY April 7, 1970            A. K. BEY            3,505,545

POLARIZED VIBRATORY MOTOR

Filed May 26, 1967            2 Sheets-Sheet 2

INVENTOR
AHMET K. BEY

Hofgren, Wagner, Allen,
Stellman & McCord
ATTYS.

United States Patent Office 3,505,545
Patented Apr. 7, 1970

3,505,545
POLARIZED VIBRATORY MOTOR
Ahmet K. Bey, Chicago, Ill., assignor of one-half to
Frances Budreck
Continuation-in-part of applications Ser. No. 511,760,
Dec. 6, 1965, and Ser. No. 516,007, Dec. 23, 1965.
This application May 26, 1967, Ser. No. 641,509
Int. Cl. H02k 33/16
U.S. Cl. 310—29
11 Claims

ABSTRACT OF THE DISCLOSURE

A stator winding coupled to a source of AC energy generates a magnetic flux field of continuously alternating magnetic polarity. A permanent magnet, fixed attached to a pivoted vibrator rotor, interacts with the alternating magnetic field to cause the rotor to oscillate or rock about the pivot.

---

This application is a continuation-in-part of my application "Vibratory Motor," Ser. No. 516,007, filed Dec. 23, 1965, now abandoned, and a continuation-in-part of my application "Electric Motor," Ser. No. 511,760, filed Dec. 6, 1965, now Patent No. 3,389,611.

The present invention relates to vibrators, and more particularly to small vibratory motors adapted for motivating devices which may be held in one hand. Motors of the indicated class are employed in electric shavers, hair clippers, automatic tooth brushes and like appliances in which motor cost and motor size are factors of significance.

It is an object of the present invention to provide an improved construction in a vibratory motor whereby motor size is minimized.

It is another object of the invention to minimize vibratory motor cost. The latter is effected in accordance with the present invention by simplifying components, their arrangement and assembly requirements.

One feature of the invention is to proide a vibrator motor construction having a stationary magnetic core about which there is wound electromagnetic coil means. An oscillatable pivoted arm with a permanent magnet arranged on said arm extends into the magnetic field generated adjacent said core for electromagnetic arm vibration. An output member on the arm transfers the vibratory force from the arm to a work piece.

Another feature of the invention is to provide a vibratory motor in which an alternating magnetic flux field, generated by an electric winding, interacts with a unidirectional magnetic flux field, generated by a permanent magnet, to cause relative movement therebetween.

Further advantages and features of the invention will be apparent from the following description and from the drawings, in which:

FIG. 1 is a perspective view of a vibratory motor embodying the present invention, its output member being upwardly disposed;

FIG. 2 is a perspective view of the motor of FIG. 1 with its output member disposed downwardly;

FIG. 3 is a transverse sectional view taken substantially on the line 3—3 of FIG. 1 and looking in the direction of the arrows;

FIG. 4 is an exploded perspective view of the motor of FIGS. 1–3 illustrating the relationship of its various components;

FIG. 5 is an elevational view of the motor of FIGS. 1–4 showing the same operatively associated in an electric shaver;

Figure 7:
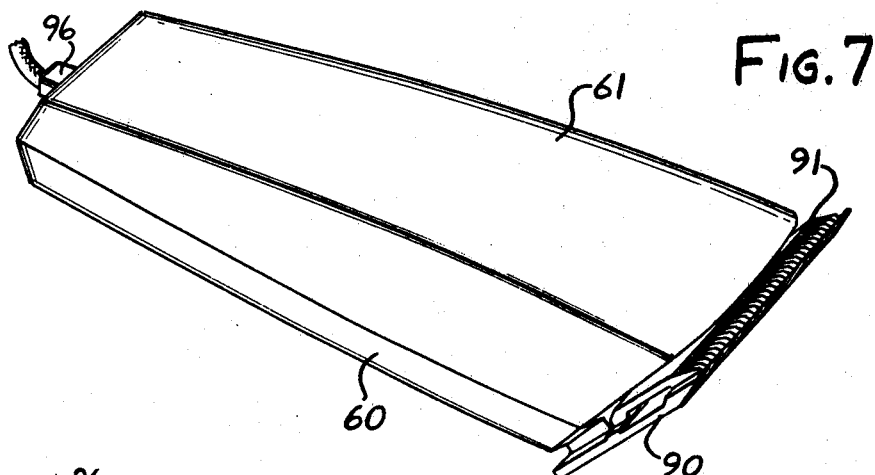
FIG. 7 is a perspective view of the electric clipper of FIG. 6, with the top cover in place.

While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated. The scope of the invention will be pointed out in the appended claims.

In the drawings, two embodiments of the applicant's vibratory motor are illustrated, as shown in FIGS. 1–5 and FIGS. 6–8, respectively. Both embodiments include a magnetizable member 12 associated with an electric winding 29 which induces a continuously alternating polarity magnetic flux field therein. The alternating magnetic flux field of member 12 interacts with a unidirectional magnetic flux field from a permanent magnet 37 to cause relative oscillatory motion therebetween in synchronism with the change in magnetic polarity from the electric winding. Preferably, the electric winding 29 and magnetizable member 12 from the stator of the vibratory motor, with the permanent magnet 37 forming a part of the rotor.

Figure 6:
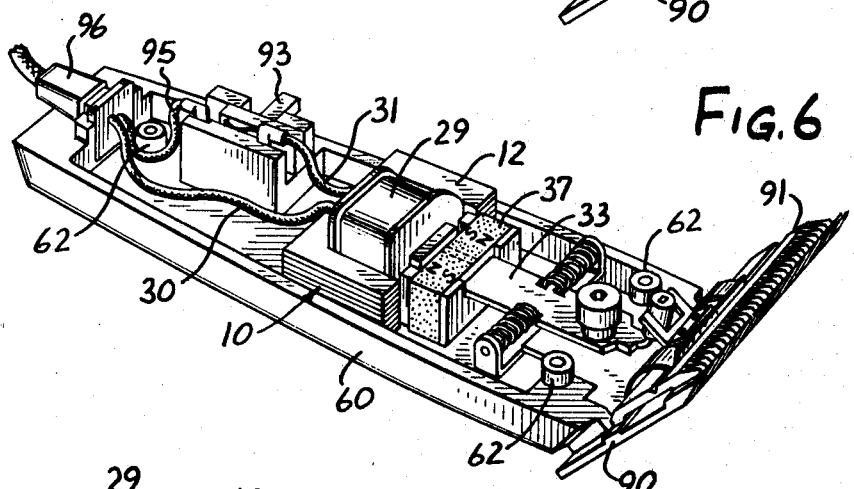
FIG. 6 is a perspective view of an electric clipper with the top cover removed, showing the arrangement of another vibratory motor constructed in accordance with the present invention.
Figure 8:
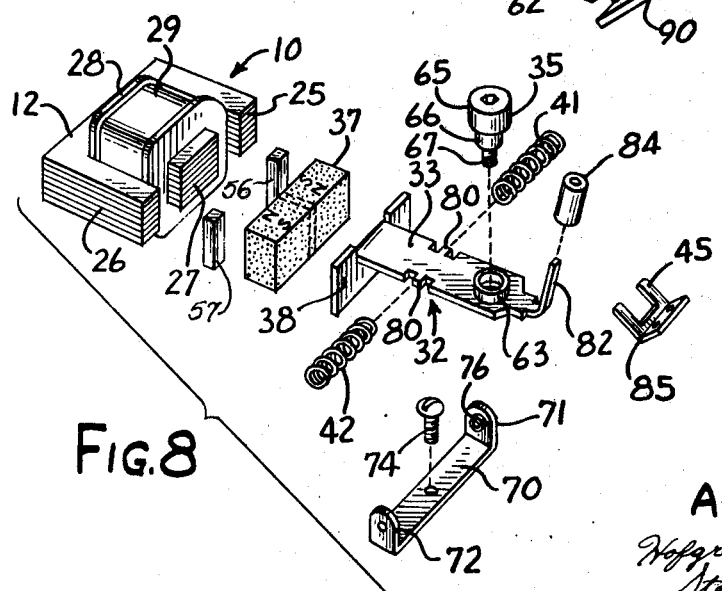
FIG. 8 is an exploded perspective view of the motor of FIG. 6, illustrating the relationship of its various components.

In the first embodiment of the invention, FIGS. 1–5, the rotor is disposed within an opening in the stator, to produce a motor of compact longitudinal dimensions. For applications where the longitudinal dimension is not as critical, but a reduction in the radial dimension of the motor is desired, the second embodiment of the invention, as illustrated in FIGS. 6–8, can be used. The second embodiment has the further advantage of providing a simplified stator structure formed from a solid laminated core, reducing the cost of the motor.

Turning now in detail to the first embodiment shown in the drawings, the vibrator motor of FIGS. 1–5 comprises a stationary member or stator generally designated 10 which is characterized by a stator framework 11 and a laminations member 12 fabricated from laminated ferromagnetic steel which serves as a core generally designated 12. The stator framework is of non-magnetic fabrication and is generally U-shaped. A pair of opposite legs 13 and 14 may be considered as defining opposite sides of the stator with a connecting piece or yoke 15 disposed at and closing one end of said stator framework, the opposite end of said stator framework being open.

As illustrated in FIG. 4, the stator framework of the exemplified embodiment is characterized by a pair of connected together mirror image sections 11A and 11B. The parts of components or structures of, or related to, said framework sections 11A and 11B are identified by appending to the reference numerals indicating each such component or structure appropriate of the letters A and B corresponding to the framework section with which component or structure is associated. Accordingly, section 11A comprises opposite side legs 13A and 14A and an integral connecting yoke section 15A. Correspondingly, the section 11B comprises opposite side legs 13B and 14B and an end connecting yoke section 15B. The connecting sections 15A and 15B are symmetrically recessed medially of their corresponding sides from their facing surfaces to provide an aperture, hole or passage 16 when the stator framework sections 11A and 11B are operatively assembled. In FIG. 4, the recesses defining said hole 16 are identified as 16A and 16B.

The legs 13 and 14 of stator framework 11 have a pair of transversely extending flanges 17 and 18, respectively. As illustrated in FIG. 4, the flanges 17 and 18 are formed by a plurality of right-angular leg extensions 17A and 17B and 18A and 18B projected away from opposite faces and fashioned at the open ends of the framework sections 11A and 11B. Furthermore, said flanges are recessed as at 19A, 19B, 20A and 20B whereby upon assembly of stator framework sections 11A and 11B a pair of wells 19 and 20 are formed in flanges 17 and 18 respectively.

When the framework sections 11A and 11B are operatively conditioned with their inner surfaces adjoining, their outer faces, which for the purpose of the instant description form the front and rear of said stator framework, provide mounts against which opposite halves or symmetrical sections 12A and 12B of the laminations member 12 are secured. The securance may be achieved by fasteners such as rivets 21, 22, 23 and 24 each of which is projected through a pair of aligned corners of the laminations member sections 12A and 12B and through the stator framework 13 sandwiched therebetween.

The laminations member 12 is generally E-shaped having a pair of outer spaced apart legs 25 and 26 and a middle leg 27, the outer legs of the section 12A being designated 25A and 26A, the outer legs of the section 12B being designated 25B and 26B. The sections 12A and 12B are proportioned in a manner such that the inner surfaces of their outer legs abut the opposite surfaces of the legs 13 and 14 of the framework 11 when the stator 10 is assembled. By reason of the construction illustrated in FIGS. 1–5, however, the medial legs 27A and 27B of said laminations member 12 will be spaced apart from each other by a distance equal to the thickness of the main portion of the framework 11 to form a passage in alignment with the hole 16.

A spool 28 with an electrical wire 29 wound thereon has disposed in its central opening 43 the central leg 27 of the laminations member 12. The inner end or flange of the spool 28 rests against the connecting yoke 15 while its outer end or flange terminates at the level of the corresponding end of the laminations member 12 which abuts or seats on a plurality of shoulders 30 generated by the extensions 17A and 17B and 18A and 18B. Thereby, an alternating polarity magnetic flux field will be established in the legs 25 and 26 of said laminations member when coil 29 is conventionally energized from an AC source through circuit wires 30 and 31.

An oscillator 32 which comprises an elongated non-magnetic arm or rod 33 has an end portion 34 disposed in the hole 16. Said end portion is pivotally connected to the framework yoke sections 15A and 15B by appropriate axis defining means 35, as illustrated in FIGS. 3 and 4. The opposite end portion 36 of said rod 33 projects away from the stator 10 from between the flanges 17 and 18, the medial portion of said arm 33 being arranged between the spool girded middle legs 27A and 27B of the laminations member sections 12A and 12B. It is appreciated that the rod 33 is proportioned in a manner such that it is rockable about the axis member 35 in the hole 16 and is adapted to vibrate between said middle legs.

A permanent magnet 37, is rigidly secured to the end portion 36 of the arm 33 with the opposite poles of said permanent magnet being arranged adjacent the laminations member legs 25 and 26, respectively. While the opposite poles of said permanent magnet are shown in one disposition in FIG. 3, said poles may be reversed, their North (N) and South (S) designations in the drawings being but illustrative.

The permanent magnet is disposed parallel to the outer end of the spool 28 and has cemented thereto a field reinforcing plate 38 of soft steel fabrication which together with the permanent magnet fashions a permanent magnet construction disposed between wells 19 and 20 heretofore defined. Said wells are internally threaded for the reception of adjusting screws 39 and 40 which adjustably bear on a pair of compression springs 41 and 42 arranged in said wells, respectively. The springs are snubbers adapted to adjustably bear against opposite sides of the permanent magnet construction to control the amplitude of the oscillations or vibrations of the oscillator 32.

Upon energization of the coil 29 with an alternating current, therefore, opposite poles of the permanent magnet construction will be alternately repelled from and attracted toward the laminations member with resultant vibration of arm 34.

A boss 44 is carried on that part of the end portion 36 of arm 33 which projects beyond the stator 10. In the present embodiment the permanent magnet construction abuts said boss and is disposed medially thereof and of spool 28. An output transition piece 45, herein shown as a bracket, is connected to the boss 44 by means of a screw 46 whereby said bracket is constrained to vibrate with oscillator 32. It is appreciated that the design of the transition piece 45 may be varied to accommodate the design of an appliance to be motivated.

In FIG. 5, the vibrator motor embodying the present invention is shown mounted in the housing 47 of an electric shaver which is only illustrative of a class of electrical appliances. The shaver has a shaving head 48 comprising a relatively stationary blade and a reciprocative blade (not shown). The reciprocative blade is part of a reciprocative assembly 49 which includes holding means 50 in which the ears 51 of a bracket 45 can be releasably engaged to reciprocate the movable blade assembly 49 when the vibrator is energized. As illustrated in FIG. 5, to energize the vibrator motor, its circuit wires 30 and 31 may be connected to suitable terminals 52 and 53 comprising an electrical socket fashioned in the housing 47 in any conventional manner.

Referring now more particularly to the vibrator motor of FIGS. 6–8, a motor of compact radial dimensions is formed by mounting the rotor or oscillator 32 of the motor outside of the stator structure 10. More particularly, the core section 12 of the stator is formed from stacked laminations of generally E-shape, in which the middle leg 27 of the E is of solid construction, rather than the hollow construction illustrated in FIGS. 1–5. The elimination of the longitudinal gap in the center leg 27 reduces the cost of constructing the stator.

Oscillator 32 comprises an elongated non-magnetic arm or rod 33 with a field reinforcing plate 38, of soft steel fabrication, fixedly attached to the end portion of the arm disposed near the core 12 and electric winding 29. Permanent magnet 37 is cemented to plate 38 with the opposite (N) and (S) poles of the permanent magnet being arranged on the face which is parallel with the end plane of leg member 25, 26 and 27. A pair of mangetizable pole pieces 56 and 57, of soft steel fabrication, are cemented to opposite poles of permanent magnet 37, and extend outwardly into the pair of gaps between end legs 25 and 26 and the center leg 27 of core 12. The pole pieces 56 and 57 concentrate the magnetic flux field across the gaps, reducing losses in the magnetic flux path and increasing the efficiency of the motor. The unidirectional magnetic flux from the permanent magnet and its pole pieces interacts with the alternating magnetic flux field established in the gaps between legs 25 and 26 and center 27 when coil 29 is energized; reciprocating pole piece 56 between a position adjacent the center leg and a position adjacent the outer leg 25, and at the same time reciprocating pole piece 57 between a position adjacent the outer leg 26 and a position adjacent the center leg. While the poles of the permanent magnet are shown in one disposition in FIGS. 6 and 8, the poles may be reversed, their North (N) and South (S) designations in the drawings being merely illustrative.

The arm 33 is pivotally connected to the stator by axis defining means 35, which secures to a lower portion 60 of the housing for an electrical appliance driven by the vibrator motor, such as an electric clipper. A top or cover portion 61, FIG. 7, may be secured to the bottom section 60 in order to form a unitary housing for the electric clipper. Three wells 62, FIG. 6, have bores therein which extend through housing 60, and are adapted to receive screws which extend into internally threaded wells (not illustrated), on the interior portion of upper housing 61, in order to secure the upper and lower portions of the housing together. The various stator portions of the vibratory motor are all fixedly connected to lower housing portion 60, in order to form a common stator structure.

Arm 33 has a well 63, preferably of non-magnetic material, mounted near the end of the arm which is opposite permanent magnet 37. Axis defining means 35 may be formed from three sections, consisting of an enlarged head portion 65, a smooth cylindrical mid-portion 66 of reduced diameter etxending through well 63 in rotatable contact therewith, and an end screw portion 67 which secures to lower housing 60, thereby pivoting arm 33 to the stator structure.

A pair of snubbers on opposite sides of arm 33 control the amplitude of the oscillations or vibrations of the oscillator 32 between the limits established by the width of the gaps between the end legs and the center leg of core 12 and the width of the pole pieces of permanent magnet 37 located in the gaps. More particularly, a bracket 70, having a pair of up-standing end portion 71 and 72, is rigidly secured to housing 60 by a screw 74 received through an opening in the mid-portion of the bracket. Each end portion 71 and 72 has a boss 76 extending inwardly therefrom and disposed to retain the coil ends of a pair of compression springs 41 and 42 which bear against opposite sides of arm 33. To retain the spring 41 and 42 against the arm, the portions of arm 33 adjacent the springs are cut away to form ears 80 received within the coil ends of the springs. If desired, the springs may adjustably bear against the arm, by means of adjusting screws similar to the snubber structure illustrated in FIG. 4.

The end of arm 33 opposite permanent magnet 37 tapers to a thin finger member 82 which connects with an output transition piece 45 for driving the appliance motivated by the vibrator motor. In the illustrative embodiment, transition piece 45 is shown as a roller 84 which slips over finger 82, and bears against a U-shaped bracket 85 connected to the applicance driven thereby. It will be noted that arm 33 is pivoted between its end portions, rather than at an end portion as in FIGS. 1–5, to provide a mechanical advantage which transforms the vibratory oscillations produced at the end of arm 33 adjacent the permanent magnet into smaller amplitude oscillations having a greater force.

The motor is illustrated as driving an electric clipper. The clipper head comprises a stationary blade 90 which is fixedly secured to the lower portion 60 of the housing. A reciprocative blade 91 is fixedly secured by screws to U-shaped bracket 85, in order to be driven past stationary blade 90 by the reciprocating motion of roller 84 when the vibrator motor is energized. As illustrated in FIG. 6, the circuit wire 31 is connected through an on-off switch 93, of the slide-action type, and an output wire 95, to a conventional electrical socket 96 for connection to a source of AC energy (not illustrated). Circuit wire 30 is directly connected with electrical socket 96, for connection to the AC source.

As many substitutions or changes could be made in the above described construction and as many apparently widely differently embodiments of the invention within the scope of the claims could be constructed without departing from the scope and spirit thereof; and it is intended that all matter contained in the accompanying specification shal be interpreted as being illustrative and not in a limiting sense.

I claim:

1. In a vibratory motor having a stator which comprises a nonmagnetic framework, including first magnetic means being electromagnetic and mounted on said framework, a vibrator moveably supported with respect to said stator and including second magnetic means arranged for magnetic motivation by said first magnetic means, said framework defining an opening in said stator in which said vibrator is mounted for oscillation by said first magnetic means, in which the vibrator comprises an arm having a pivoted portion connected to said framework and an opposed portion, said second magnetic means comprising a permanent magnet secured on said opposed portion for motivating said arm upon electrical excitation of said first magnetic means with an alternating current.

2. In a vibratory motor having a stator, including first magnetic means, a vibrator moveably supported with respect to said stator and including second magnetic means arranged for magnetic motivation by said first magnetic means, said stator comprises a nonmagnetic framework characterized by a pair of connected frame members defining a hole at one end of said framework, the first magnetic means comprising a pair of electromagnetic members mounted in spaced apart relationship on opposite sides of said framework, said vibrator extending between said electromagnetic members and having an end portion pivotally connected in said hole and an opposed output end portion.

3. In a vibratory motor having a stator, including first magnetic means, a vibrator moveably supported with respect to said stator and including second magnetic means arranged for magnetic motivation by said first magnetic means, said stator comprises a nonmagnetic framework, said first magnetic means comprising a pair of spaced apart ferromagnetic lamination member secured on said framework and an electric wire coil mounted about said laminations members, the vibrator comprising an arm pivoted to said framework and arranged for rocking between said laminations members and within said coil, said second magnetic means comprising a permanent magnet construction arranged adjacent an end of said stator for rocking said arm.

4. In a vibratory motor having a stator, including first magnetic means, a vibrator moveably supported with respect to said stator and including second magnetic means arranged for magnetic motivation by said first magnetic means, said stator comprises a nonmagnetic framework, said second magnetic means mounted thereon, said framework having a pair of opposed snubber receptacles, said vibrator pivoted to said framework and having a portion extending between said receptacles, and adjustable snubbers mounted in said receptacles to control the amplitude of the oscillations of said vibrator.

5. A vibratory motor as defined in claim 4 in which the vibrator comprises a non-magnetic arm, said second magnetic means disposed between said snubbers for alternate engagement thereby.

6. An electric motor, comprising:

a stator including a center arm and a pair of opposed arms located on opposite sides of the center arm and defining a pair of air spaces therebetween, a coil of wire connectable with a source of alternating current for inducing a continuously alternating polarity magnetic field in said arms and across said pair of air spaces, and a rotor including a permanent magnet having on one side thereof which is generally parallel with an end plane of said arms a pair of opposite polarity permanently magnetized poles thereon for generating a unidirectional polarity magnetic field therebetween, each pole of said permanent magnet being disposed adjacent a different one of said pair of air spaces, a magnetizable pole piece fixedly attached to said permanent magnet adjacent each pole thereon and extending into the air space adjacent thereto.

7. An electric motor, comprising:

a relatively fixed laminations member having a center arm and a pair of side arms disposed on opposite sides of said center arm and defining a pair of wells therebetween, a coil of wire connectable with a source of alternating current for inducing a magnetic field of continuously alternating magnetic polarity in said laminations member, a relatively rotatable member including a permanent magnet having on one face thereof which is generally parallel with an end plane of said arms a pair of opposed magnetic polar areas located adjacent the pair of wells defined by said opposed arms, a pair of elongated pole pieces of magnetizable material secured to the permanent magnet at the opposed polar areas and extending therefrom into the pair of wells defined by said opposed arms, and means pivotally connecting said permanent magnet to said fixed member for oscillatory motion about a pivot point in response to the alternation of the magnetic field from said laminations member.

8. The electric motor of claim 7 wherein said permanent magnet has on a face opposite said one face another pair of opposed magnetic polar areas, and a plate of magnetizable material attached to said opposite face and extending substantially across said another apir of opposed magnetic polar areas, whereby substantially all of the magnetic field in space from said permanent magnet extends between said pair of elongated pole pieces.

9. An electric motor, comprising:

a relatively fixed stator member, a rotor member, one of said members including a pair of magnetizable elements with an air space therebetween and means for inducing in said element a continuously alternating polarity magnetic field which extends in a direction across said air space, and the other of said members including a permanent magnet with one side adjacent said air space and generally parallel with the direction of extent of said alternating polarity magnetic field, a pair of opposite magnetic pole regions on said one side and having a unidirectional polarity magnetic field therebetween for interaction with said alternating magnetic field to produce relative motion between said members.

10. An electric motor, comprising: a relatively fixed stator member, a rotor member, one of said members including a pair of magnetizable elements with an air space therebetween and means for inducing in said element a continuously alternating polarity magnetic field which extends across said air space, the other of said members including means for generating a unidirectional polarity magnetic field including a block of permanently magnetized material having first and second faces on opposite sides of the block, said material being magnetized to create at least a pair of opposite magnetic poles on said first face and a pair of opposite magnetic poles on said second face, means composed of magnetizable material attached to said first face and extending substantially across said pair of poles, whereby substantially all of the magnetic field in the air space surrounding said block and attached magnetizable means extends between said pair of poles on said second face of said block, and means mounting said block so that the magnetic field between said pair of poles on said second face is located within said air space between the pair of magnetizable elements of said one member, whereby the interaction of the unidirectional polarity magnetic field with said alternating magnetic field produces relative motion therebetween.

11. The electric motor of claim 9 wherein said other of said members further includes a magnetizable pole piece fixedly attached to said one side of said permanent magnet, located adjacent one of said pair of pole regions, and extending from said one face outward into the air space for intersecting at least a portion of said alternating polarity magnetic field extending across said air space.

References Cited

UNITED STATES PATENTS

| | | | |
|---|---|---|---|
| 2,521,653 | 9/1950 | Ruud | 310—37 |
| 2,530,759 | 11/1950 | Collins | 310—29 XR |
| 2,987,635 | 6/1961 | Nachtman et al. | 310—38 XR |
| 2,994,016 | 7/1961 | Tibbetts et al. | 310—25 XR |
| 3,202,849 | 8/1965 | Neal | 310—37 |
| 3,302,045 | 1/1967 | Dotto | 310—37 |
| 3,349,262 | 10/1967 | Gibbons | 310—37 |
| 3,351,789 | 11/1967 | Bertling | 310—37 |
| 2,734,139 | 2/1956 | Murphy | 310—29 |

MILTON O. HIRSHFIELD, Primary Examiner

D. F. DUGGAN, Assistant Examiner

U.S. Cl. X.R.

310—36